(12) United States Patent
Hassan et al.

(10) Patent No.: US 11,250,279 B2
(45) Date of Patent: Feb. 15, 2022

(54) GENERATIVE ADVERSARIAL NETWORK MODELS FOR SMALL ROADWAY OBJECT DETECTION

(71) Applicant: Robert Bosch GmbH, Stuttgart (DE)

(72) Inventors: Eman Hassan, Bloomington, IN (US); Nanxiang Li, San Mateo, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/836,426

(22) Filed: Mar. 31, 2020

(65) Prior Publication Data

US 2021/0303885 A1 Sep. 30, 2021

(51) Int. Cl.
*G06K 9/00* (2006.01)
*G06T 7/70* (2017.01)
*G06K 9/62* (2006.01)

(52) U.S. Cl.
CPC ....... *G06K 9/00825* (2013.01); *G06K 9/6262* (2013.01); *G06T 7/70* (2017.01); *G06T 2207/20081* (2013.01); *G06T 2207/20084* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 11,023,749 B2* | 6/2021 | Garimella | | G08G 1/056 |
| 2019/0080206 A1* | 3/2019 | Hotson | | G06K 9/00798 |
| 2019/0096125 A1* | 3/2019 | Schulter | | G05D 1/0088 |
| 2019/0272389 A1* | 9/2019 | Viente | | G01C 21/3602 |
| 2020/0134354 A1* | 4/2020 | Viswanathan | | G06K 9/6271 |
| 2020/0309541 A1* | 10/2020 | Lavy | | G06K 9/6256 |
| 2021/0004611 A1* | 1/2021 | Garimella | | G06K 9/00798 |
| 2021/0201050 A1* | 7/2021 | Marschner | | G06K 9/726 |

OTHER PUBLICATIONS

Ugur et al., "Patch-Based Image Inpainting with Generative Adversarial Networks", Mar. 20, 2018, Computer Science, Computer Vision and Pattern Recognition.*

(Continued)

*Primary Examiner* — Omar S Ismail
(74) *Attorney, Agent, or Firm* — Michael Best & Friedrich LLP

(57) ABSTRACT

Systems, methods, and non-transitory computer-readable media for detecting small objects in a roadway scene. A camera is coupled to a vehicle and configured to capture a roadway scene image. An electronic controller is coupled to the camera and configured to receive the roadway scene image from the camera. The electronic controller is also configured to generate a Generative Adversarial Network (GAN) model using the roadway scene image. The electronic controller is further configured to determine a distribution indicting how likely each location in the roadway scene image can contain a roadway object using the GAN model. The electronic controller is also configured to determine a plurality of locations in the roadway scene image by sampling the distribution. The electronic controller is further configured to detect the roadway object at one of the plurality of locations in the roadway scene images.

20 Claims, 4 Drawing Sheets

(56) References Cited

OTHER PUBLICATIONS

Kaiwen Duan, Song Bai, Lingxi Xie, Honggang Qi, Qing-ming Huang, and Qi Tian. Centernet: Object detection with keypoint triplets. arXiv preprint arXiv: 1904.08189, 2019.

Hei Law and Jia Deng. Cornernet: Detecting objects as paired keypoints. In Proceedings of the European Conference on Computer Vision (ECCV), pp. 734-750, 2018.

Jiaqi Wang, Kai Chen, Shuo Yang, Chen Change Loy, and Dahua Lin. Region proposal by guided anchoring. In Proceedings of the IEEE Conference on Computer Vision and Pattern Recognition, pp. 2965-2974, 2019.

* cited by examiner

GENERATIVE ADVERSARIAL NETWORK MODELS FOR SMALL ROADWAY OBJECT DETECTION

FIELD

The disclosure relates generally to small objection detection using generative adversarial network models. More specifically, the disclosure relates to small objection detection in roadway scenes using generative adversarial network models.

BACKGROUND

Roadway scene understanding is important in autonomous driving applications. Object detection plays an important role in roadway scene understanding. However, detecting small objects in image data (for example, traffic lights) is challenging because small objects are generally located far away from the detector and have very low contrast compared to their surroundings.

SUMMARY

Deep detector models are used for detecting objects in image data. However, small roadway object detection remains a challenge for deep detector models. Thus, the disclosure provides, among other things, systems, methods, and non-transitory computer-readable media for detecting small objects in a roadway scene.

The disclosure provides a system for detecting small objects in a roadway scene. In some implementations, the system includes a camera and an electronic controller. The camera is coupled to a vehicle and configured to capture a roadway scene image. The electronic controller is coupled to the camera. The electronic controller is configured to receive the roadway scene image from the camera. The electronic controller is also configured to generate a Generative Adversarial Network (GAN) model using the roadway scene image. The electronic controller is further configured to determine a distribution indicting how likely each location in the roadway scene image can contain a roadway object using the GAN model. The electronic controller is also configured to determine a plurality of locations in the roadway scene image by sampling the distribution. The electronic controller is further configured to detect the roadway object at one of the plurality of locations in the roadway scene image.

The disclosure also provides a method for detecting small objects in a roadway scene. The method includes receiving, with an electronic processor, a roadway scene image from a camera coupled to a vehicle. The method also includes generating, with the electronic processor, a Generative Adversarial Network (GAN) model using the roadway scene image. The method further includes determining, with the electronic processor, a distribution indicting how likely each location in the roadway scene image can contain a roadway object using the GAN model. The method also includes determining, with the electronic processor, a plurality of locations in the roadway scene image by sampling the distribution. The method further includes detecting, with the electronic processor, the roadway object at one of the plurality of locations in the roadway scene image.

The disclosure also provides a non-transitory computer-readable medium storing computer-readable instructions that, when executed by an electronic processor of a computer, cause the computer to perform operations. The operations include receiving a roadway scene image from a camera coupled to a vehicle. The operations also include generating a Generative Adversarial Network (GAN) model using the roadway scene image. The operations further include determining a distribution indicting how likely each location in the roadway scene image can contain a roadway object using the GAN model. The operations also include determining a plurality of locations in the roadway scene image by sampling the distribution. The operations further include detecting the roadway object at one of the plurality of locations in the roadway scene image.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments, and explain various principles and advantages of those embodiments.

Figure 1:
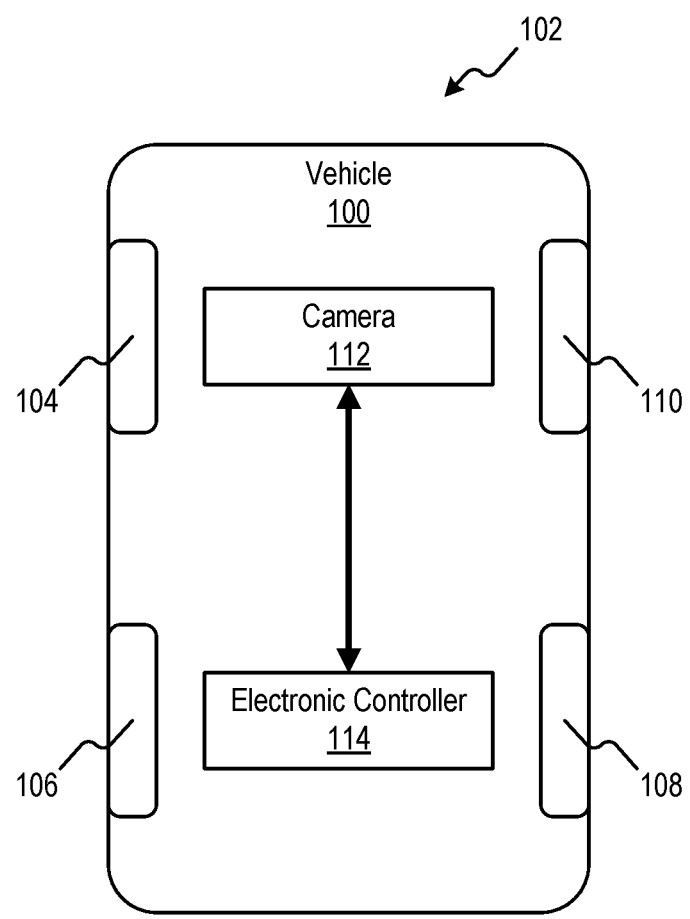
FIG. 1 is a block diagram of one example of a vehicle equipped with a system for detecting small objects in a roadway scene, in accordance with some embodiments.

The system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

FIG. 1 is a block diagram of one example of a vehicle 100 equipped with a system 102 for detecting small objects in a roadway image. The vehicle 100 illustrated in FIG. 1 is an automobile that includes four wheels 104, 106, 108, and 110. In some implementations, the system 102 is equipped to a vehicle with more or less than four wheels. For example, the system 102 may be equipped to a motorcycle, a truck, a bus, a trailer, and the like. In practice, the vehicle 100 includes additional components such as a propulsion system, a steering system, a braking system, and the like. For ease of explanation, these additional components are not illustrated here.

The system 102 illustrated in FIG. 1 includes a camera 112 and an electronic controller 114. In some implementations, the system 102 includes fewer or additional components in configurations different from the one illustrated in FIG. 1. The camera 112 is coupled to a component of the vehicle 100 facing in the direction of forward driving (for example, a front bumper, a hood, a rear-view mirror, and the like). The camera 112 is configured to capture roadway scene images of the surroundings of the vehicle 100 (for example, a traffic scene). Roadway scene images may include small roadway objects. Small roadway objects include, for example, road markings, traffic signs, traffic lights, roadside objects (for example, trees and poles), and other common objects found in a roadway scene. In some implementations, the camera 112 includes one or more video cameras, one or more photographic cameras, or a combination thereof. The camera 112 is configured to transmit the captured roadway scene images to the electronic controller 114.

Figure 2:
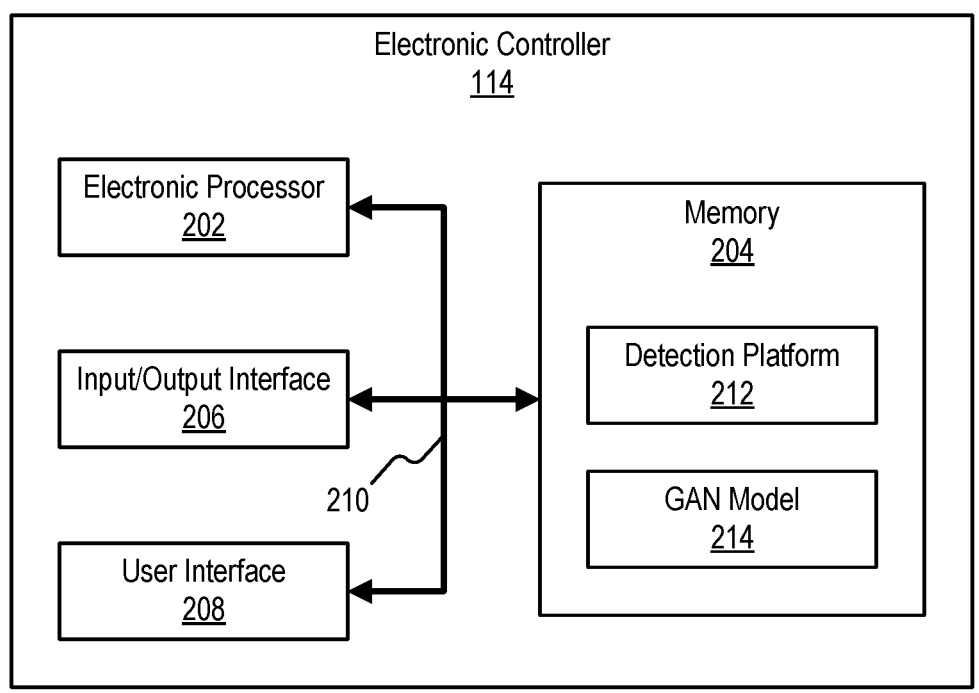
FIG. 2 is a block diagram of one example of an electronic controller included in the system illustrated in FIG. 1, in accordance with some embodiments.

FIG. 2 is a block diagram of one example of the electronic controller 114. The electronic controller 114 illustrated in FIG. 2 includes an electronic processor 202 (for example, one or more microprocessors, application-specific integrated circuits (ASICs), systems-on-a-chip (SoCs), or other electronic controllers), memory 204, an input/output interface 206, a user interface 208, and a bus 210. In some implementations, the electronic controller 114 includes fewer or additional components in configurations different from the one illustrated in FIG. 2. For example, in practice, the electronic controller 114 may include additional components such as one or more power supplies, one or more sensors, and the like. For ease of explanation, these additional components are not illustrated here.

The input/output interface 206 includes routines for transferring information between components within the electronic controller 114 and components external to the electronic controller 114. For example, the input/output interface 206 allows the electronic processor 202 to communicate with external hardware, such as the camera 112. The input/output interface 206 is configured to transmit and receive data via one or more wired couplings (for example, wires, optical fiber, and the like), wirelessly, or a combination thereof.

The user interface 208 includes, for example, one or more input mechanisms (for example, a touch screen, a keypad, a button, a knob, and the like), one or more output mechanisms (for example, a display, a printer, a speaker, and the like), or a combination thereof. In some implementations, the user interface 208 includes a touch-sensitive interface (for example, a touch-screen display) that displays visual output generated by software applications executed by the electronic processor 202. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 208 is separated from the electronic controller 114.

The bus 210 connects various components of the electronic controller 114 including, for example, the memory 204 to the electronic processor 202. The memory 204 includes, for example, read only memory (ROM), random access memory (RAM), an electrically erasable programmable read-only memory (EEPROM), other non-transitory computer-readable media, or a combination thereof. In some implementations, the memory 204 is included in the electronic processor 202. The electronic processor 202 is configured to retrieve computer-readable instructions and data from the memory 204 and execute the computer-readable instructions to perform the functionality described herein. The memory 204 illustrated in FIG. 2 includes a detection platform 212 and a Generative Adversarial Network (GAN) model 214. The detection platform 212 includes computer-readable instructions that cause the electronic processor 202 to perform, among other things, the methods described herein. For example, the detection platform 212 includes computer-readable instructions that cause the electronic processor 202 to generate the GAN model 214 to detect traffic lights (and other small roadway objects) in image data.

Current deep detector models rely on detecting features of an object. If the object is too small within an observed scene, the detector model may fail to detect the object. This can cause driving hazards for vehicles, especially autonomous vehicles, because important small objects, such as traffic lights, may not be detected, and appropriate actions, such as stopping at a red light, will not be performed. The semantics of a roadway scene can provide an efficient method of predicting how likely a roadway object may exist within the roadway scene. For example, human perception can predict how likely a roadway object can exist in certain locations based on the semantics of a roadway scene and without see the roadway object itself. As described in more detail below, the GAN model 214 is configured to predict the existence of a roadway object using the semantics of the roadway scene rather than relying on features of the roadway object.

A GAN is a class of machine learning systems in which two neural networks contest each other in a game. For example, one neural network generates augmented roadway scene images that appear authentic and the second neural network evaluates the augmented roadway scene images for authenticity. The GAN model 214 is trained to understand the semantics of a roadway scene and determine how likely any location can contain a roadway object. To understand the semantics of roadway scenes, in some implementations, the GAN model 214 is trained using inpainted images where a roadway object is removed from a roadway scene image and the GAN model 214 determines the existence of the removed roadway object using the original ground truth of the original image. In some implementations, the output of the GAN model 214 is a multi-scale prediction in which one scale predicts the center of the roadway object and the second scale predicts a distribution (or heatmap) indicating how likely each location in the roadway scene image can contain the roadway object. In some implementations, the GAN model 214 is trained using an intersection over union ("IoU") function, a reconstruction loss function, a GAN loss function, or a combination thereof.

Figure 3:
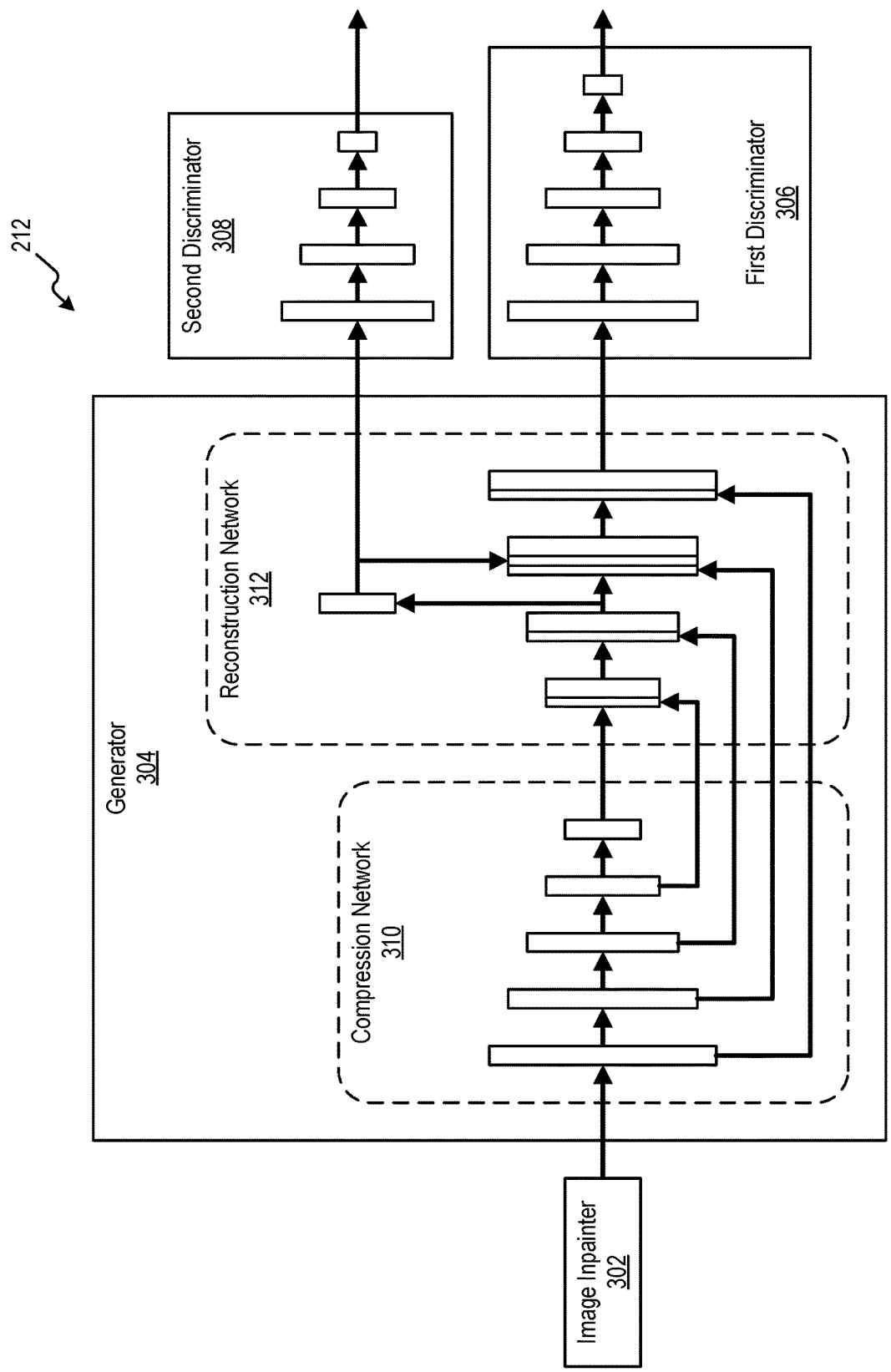
FIG. 3 is a block diagram of one example of a Generative Adversarial Network (GAN) model, in accordance with some embodiments.

FIG. 3 is a block diagram of one example of the GAN model 214. The GAN model 214 illustrated in FIG. 3 includes an image inpainter 302, a generator 304, a first discriminator 306, and a second discriminator 308. In some implementations, the GAN model 214 includes fewer or additional components in configurations different from the one illustrated in FIG. 3. For example, the GAN model 214 may include more than one generator and more or less than two discriminators. Also, in practice, the GAN model 214 may include additional components such as one or more feedback networks, one or more backpropagation networks, one or more encoders, one or more decoders, and the like. For ease of explanation, these additional components are not illustrated here.

The image inpainter 302 is configured to receive a roadway scene image and remove one or more traffic lights included therein to generate an inpainted image with the one or more traffic lights removed. In some implementations, the image inpainter 302 sets every pixel in the roadway scene image that contains a traffic light to a predetermined value (for example, zero). The inpainted image is input into the generator 304. The generator 304 illustrated in FIG. 3 includes a compression network 310 and a reconstruction network 312. The compression network 310 is configured to compress the content of the inpainted image into a smaller amount of content. The smaller amount of content that the compression network 310 outputs is the most meaningful content of the inpainted image and represents an understanding of key connections between the positioning of roadway objects and their surroundings. The reconstruction network 312 is configured to reconstruct the original image starting with the most meaningful content that is output by the compression network 310. For example, the reconstruction network 312 using the most meaningful content to select a location to add a roadway object that is likely to be semantically-consistent with the roadway scene. The first discriminator 306 and the second discriminator 308 are configured to compare reconstructed images generated by the generator 304 to the original image to determine whether the reconstructed images are realistic or unrealistic. The first discriminator 306 and the second discriminator 308 compare different scales of reconstructed images. For example, the first discriminator 306 determines whether the final reconstructed image generated by the generator 304 is realistic or unrealistic. Further, the second discriminator 308 determines whether an earlier stage of the reconstructed image generated by the generator 304 is realistic or unrealistic. Based on the determinations of the first discriminator 306 and the second discriminator 308, the generator 304 is configured to adjust parameters within the compression network 310 and the reconstruction network 312 used to determine locations to add roadway objects that are likely to be semantically-consistent with the roadway scene.

After numerous iterations of the training described above, the generator 304 is configured to consistently generate reconstructed images which are determined to be authentic by the first discriminator 306, the second discriminator 308, or both. As a result of the training, the first discriminator 306 determines a distribution of how likely any location in a roadway scene image can contain a roadway object based on the semantics of the roadway scene. Further, as a result of the training, the second discriminator 308 determines the locations of the centers of roadway objects in the roadway scene image (i.e., anchor centers that can be sampled to detect small and occluded roadway objects). The determined distribution and anchor centers are used to detect roadway objects in roadway scene images, as will be described in more detail below.

Figure 4:
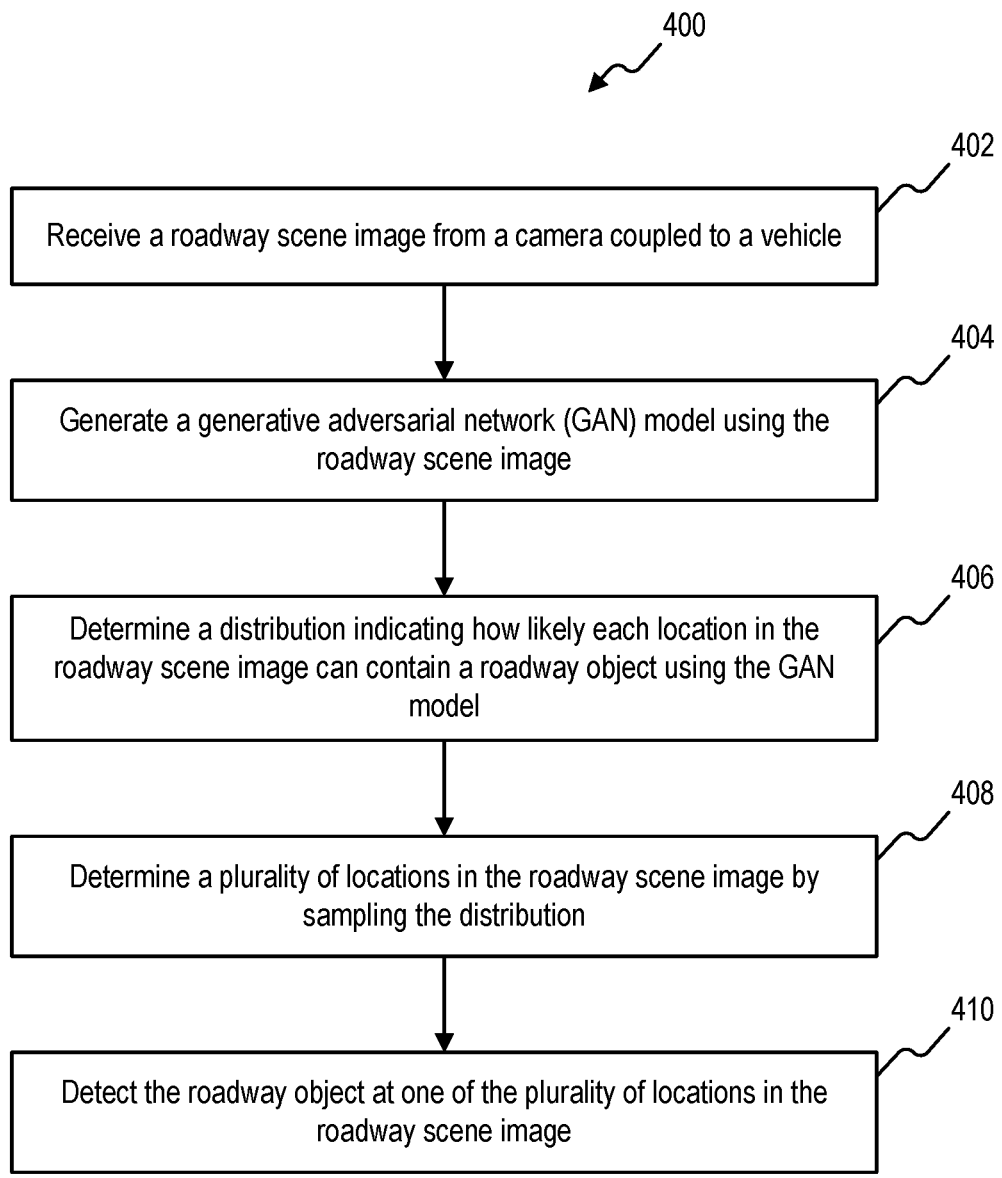
FIG. 4 is a flow diagram of one example of a method for detecting small objects in a roadway scene, in accordance with some embodiments.

FIG. 4 is a flow diagram of one example of a method 400 of detecting small objects in a roadway scene. In some implementations, the detection platform 212 includes computer-readable instructions that cause the electronic processor 202 to perform all (or any combination) of the blocks of method 400 described below. At block 402, a roadway scene image is received from the camera 112 which, as described above, is coupled to the vehicle 100. For example, the electronic processor 202 receives a roadway scene image from the camera 112 via the input/output interface 206. In some implementations, the camera 112 continuously captures video data of the roadway scene and transmits the video data as the roadway scene image to the electronic processor 202. In some implementations, the camera 112 captures still images of the roadway scene and transmits the still images as the roadway scene image to the electronic processor 202. At block 404, the GAN model 214 is generated using the roadway scene image. For example, the GAN model 214 is generated using the inpainted image as described above in relation to FIG. 3.

At block 406, a distribution indicating how likely each location in the roadway scene image can contain a roadway object is determined using the GAN model 214. For example, the electronic processor 202 determines the distribution using the GAN model 214 described above in relation to FIG. 3. In some implementations, the GAN model 214 is configured to determine the distribution based only on the semantics of the roadway scene image. For example, traffic lights can be located overhead of the vehicle 100 or on the side of a road the vehicle 100 is traveling on. Both instances of traffic lights would be supported by poles or other hanging mechanisms. The GAN model 214 may be configured to identify a post or pole designed for holding a traffic light or a crosswalk indicating an intersection that may include a traffic light. In some implementations, the GAN model 214 is configured to determine the distribution based on the semantics of the roadway scene image and on at least one feature of the roadway object. For example, to detect a traffic light, the GAN model 214 is configured to identify three adjacently placed circles (i.e., the red, yellow, and green lights).

In some implementations, the distribution defines a set of anchor points to sample for detecting the roadway object. In some implementations, the distribution includes a heat map illustrating one or more predicted locations of the roadway object. In some implementations, the distribution includes a plurality of heat maps with unique configurations based on random vectors. The random vectors are associated with different factors of the roadway scene (for example, lighting, background objects, and the like). Based upon the random vector, each generated heat map of the plurality of heat maps has a unique configuration.

At block 408, a plurality of locations in the roadway scene image are selected by sampling the distribution. For example, the electronic processor 202 samples the distribution to select a plurality of locations with a high likelihood of containing a roadway object. At block 410, the roadway object is detected at one of the plurality of locations in the roadway scene image. For example, the electronic processor 202 is configured use a deep neural network model to analyze each of the plurality of locations in the roadway scene image and detect the roadway object in one of the plurality of locations.

In some implementations, the electronic processor 202 is configured to take at least one action for the vehicle 100 based upon detecting the roadway object at block 410. The action may be tracking the roadway object in later captured roadway scene images or performing a driving maneuver based upon the roadway object. For example, if the roadway object is a traffic light, the traffic light may be tracked and, if the traffic light is yellow or red, the electronic processor 202 may generate a command to the vehicle 100 to stop at the traffic light.

The GAN model 214 described herein enables detection of small roadway objects that are undetectable using other models. For example, Table 1 illustrates examples of percentages of traffic light that were not detected by other models but were detected using the GAN model 214 described herein.

TABLE 1

| SAMPLING EFFICIENCY COMPARISON | | | | | |
|---|---|---|---|---|---|
| 50 Samples | 100 Samples | 300 Samples | 500 Samples | 1,000 Samples | 2,000 Samples |
| 0.196 | 0.3 | 0.52 | 0.571 | 0.588 | 0.594 |

Various aspects of the disclosure may take any one or more of the following exemplary configurations.

EEE(1) A system for detecting small objects in a roadway scene, the system comprising: a camera coupled to a vehicle, the camera configured to capture a roadway scene image; and an electronic controller coupled to the camera, the electronic controller configured to: receive the roadway scene image from the camera, generate a Generative Adversarial Network (GAN) model using the roadway scene image, determine a distribution indicting how likely each location in the roadway scene image can contain a roadway object using the GAN model, determine a plurality of locations in the roadway scene image by sampling the distribution, and detect the roadway object at one of the plurality of locations in the roadway scene image.

EEE(2) The system of EEE(1), wherein electronic controller is further configured to: remove the roadway object from the roadway scene image to generate an inpainted image, and generate the GAN model using the inpainted image.

EEE(3) The system of EEE(1) or EEE(2), wherein the GAN model is configured to determine the distribution based only on semantics of the roadway scene image.

EEE(4) The system of EEE(1) or EEE(2), wherein the GAN model is configured to determine the distribution based on semantics of the roadway scene image and at least one feature of the roadway object.

EEE(5) The system of any one of EEE(1) to EEE(4), wherein the distribution defines a set of anchor points to sample for the roadway object.

EEE(6) The system of any one of EEE(1) to EEE(5), wherein the distribution includes a heat map illustrating one or more predicted locations of the roadway object.

EEE(7) The system of any one of EEE(1) to EEE(6), wherein the distribution includes a plurality of heat maps, wherein each of the plurality of heat maps has a unique configuration based on a random vector.

EEE(8) The system of EEE(7), wherein the random vector is based upon a set of factors of the roadway scene image.

EEE(9) The system of any one of EEE(1) to EEE(8), wherein electronic controller is further configured to take at least one action for the vehicle based upon detecting the roadway object.

EEE(10) A method for detecting small objects in a roadway scene, the method comprising: receiving, with an electronic processor, a roadway scene image from a camera coupled to a vehicle; generating, with the electronic processor, a Generative Adversarial Network (GAN) model using the roadway scene image; determining, with the electronic processor, a distribution indicting how likely each location in the roadway scene image can contain a roadway object using the GAN model; determining, with the electronic processor, a plurality of locations in the roadway scene image by sampling the distribution; and detecting, with the electronic processor, the roadway object at one of the plurality of locations in the roadway scene image.

EEE(11) The method of EEE(10), further comprising: removing, with the electronic processor, the roadway object from the roadway scene image to generate an inpainted image; and generating, with the electronic processor, the GAN model using the inpainted image.

EEE(12) The method of EEE(10) or EEE(11), wherein the GAN model determines the distribution based only on semantics of the roadway scene image.

EEE(13) The method of EEE(10) or EEE(11), wherein the GAN model determines the distribution based on semantics of the roadway scene image and at least one feature of the roadway object.

EEE(14) The method of any one of EEE(10) to EEE(13), wherein the distribution defines a set of anchor points to sample for the roadway object.

EEE(15) The method of any one of EEE(10) to EEE (14), wherein the distribution includes a heat map illustrating one or more predicted locations of the roadway object.

EEE(16) The method of any one of EEE(10) to EEE(15), wherein the distribution includes a plurality of heat maps, wherein each of the plurality of heat maps has a unique configuration based on a random vector.

EEE(17) The method of EEE(16), wherein the random vector is based upon a set of factors of the roadway scene image.

EEE(18) The method of any one of EEE(11) to EEE (17), further comprising taking, with the electronic processor, at least one action for the vehicle based upon detecting the roadway object.

EEE(19) A non-transitory computer-readable medium storing computer-readable instructions that, when executed by an electronic processor of a computer, cause the computer to perform operations comprising: receiving a roadway scene image from a camera coupled to a vehicle; generating a Generative Adversarial Network (GAN) model using the roadway scene image; determining a distribution indicting how likely each location in the roadway scene image can contain a roadway object using the GAN model; determining a plurality of locations in the roadway scene image by sampling the distribution; and detecting the roadway object at one of the plurality of locations in the roadway scene image.

EEE(20) The non-transitory computer-readable medium of EEE(19), wherein the operations further comprising: removing the roadway object from the roadway scene image to generate an inpainted image; and generating the GAN model using the inpainted image.

Thus, the disclosure provides, among other things, systems, methods, and non-transitory computer-readable media for detecting small objects in a roadway scene. Various features, advantages, and embodiments are set forth in the following claims.

Machine learning generally refers to the ability of a computer program to learn without being explicitly programmed. In some implementations, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for detecting small objects in a roadway scene, the system comprising:
a camera coupled to a vehicle, the camera configured to capture a roadway scene image the roadway scene image including a first plurality of locations; and
an electronic controller coupled to the camera, the electronic configured to:
receive the roadway scene image from the camera,
generate a Generative Adversarial Network (GAN) model using the roadway scene image,
determine a distribution indicating how likely each location of the first plurality of locations in the roadway scene image can contain a roadway object using the GAN model,
determine a second plurality of locations in the first plurality of locations in the roadway scene image by sampling the distribution,
determine a feature of the roadway object, and
detect the roadway object at one of the second plurality of locations in the roadway scene image based at least in part on the feature of the roadway object.

2. The system of claim 1, wherein electronic controller is further configured to:
remove the roadway object from the roadway scene image to generate an inpainted image, and generate the GAN model using the inpainted image.

3. The system of claim 1, wherein the GAN model is configured to determine the distribution based only on semantics of the roadway scene image.

4. The system of claim 1, wherein the GAN model is configured to determine the distribution based on semantics of the roadway scene image and at least one feature of the roadway object.

5. The system of claim 1, wherein the distribution defines a set of anchor points to sample for the roadway object.

6. The system of claim 1, wherein the distribution includes a heat map illustrating one or more predicted locations of the roadway object.

7. The system of claim 1, wherein the distribution includes a plurality of heat maps, wherein each of the plurality of heat maps has a unique configuration based on a random vector.

8. The system of claim 7, wherein the random vector is based upon a set of factors of the roadway scene image.

9. The system of claim 1, wherein electronic controller is further configured to take at least one action for the vehicle based upon detecting the roadway object.

10. A method for detecting small objects in a roadway scene, the method comprising:
receiving, with an electronic processor, a roadway scene image from a camera coupled to a vehicle, the roadway scene image including a first plurality of locations;
generating, with the electronic processor, a Generative Adversarial Network (GAN) model using the roadway scene image;
determining, with the electronic processor, a distribution indicating how likely each location of the first plurality of locations in the roadway scene image can contain a roadway object using the GAN model;
determining, with the electronic processor, a second plurality of locations in the first plurality of locations in the roadway scene image by sampling the distribution;
determining, with the electronic processor, a feature of the roadway object, and
detecting, with the electronic processor, the roadway object at one of the second plurality of locations in the roadway scene image based at least in part on the feature of the roadway object.

11. The method of claim 10, further comprising:
removing, with the electronic processor, the roadway object from the roadway scene image to generate an inpainted image; and
generating, with the electronic processor, the GAN model using the inpainted image.

12. The method of claim 10, wherein the GAN model determines the distribution based only on semantics of the roadway scene image.

13. The method of claim 10, wherein the GAN model determines the distribution based on semantics of the roadway scene image and at least one feature of the roadway object.

14. The method of claim 10, wherein the distribution defines a set of anchor points to sample for the roadway object.

15. The method of claim 10, wherein the distribution includes a heat map illustrating one or more predicted locations of the roadway object.

16. The method of claim 10, wherein the distribution includes a plurality of heat maps, wherein each of the plurality of heat maps has a unique configuration based on a random vector.

17. The method of claim 16, wherein the random vector is based upon a set of factors of the roadway scene image.

18. The method of claim 10, further comprising taking, with the electronic processor, at least one action for the vehicle based upon detecting the roadway object.

19. A non-transitory computer-readable medium storing computer-readable instructions that, when executed by an electronic processor of a computer, cause the computer to perform operations comprising:

receiving a roadway scene image from a camera coupled to a vehicle, the roadway scene image including a first plurality of locations;

generating a Generative Adversarial Network (GAN) model using the roadway scene image;

determining a distribution indicating how likely each location of the first plurality of locations in the roadway scene image can contain a roadway object using the GAN model;

determining a second plurality of locations in the first plurality of locations in the roadway scene image by sampling the distribution; and detecting the roadway object at one of the second plurality of locations in the roadway scene image.

20. The non-transitory computer-readable medium of claim 19, wherein the operations further comprising:

removing the roadway object from the roadway scene image to generate an inpainted image; and generating the GAN model using the inpainted image.

* * * * *